United States Patent
Abele et al.

(10) Patent No.: US 7,216,925 B1
(45) Date of Patent: May 15, 2007

(54) HEIGHT CONTROL LINKAGE FOR A VEHICLE CAB SUSPENSION

(75) Inventors: Dennis Lynn Abele, Sheldon, IA (US); Gregory W. Hulstein, Sioux Center, IA (US)

(73) Assignee: Link Mfg., Ltd., Sioux Center, IA (US)

( * ) Notice: Subject to any disclaimer, the term of this patent is extended or adjusted under 35 U.S.C. 154(b) by 280 days.

(21) Appl. No.: 11/052,413

(22) Filed: Feb. 7, 2005

(51) Int. Cl.
*B62D 24/04* (2006.01)

(52) U.S. Cl. .............................. 296/190.07; 180/89.13; 180/89.18

(58) Field of Classification Search ............. 296/190.7, 296/190.04, 190.05; 180/89.13, 89.18
See application file for complete search history.

(56) References Cited

U.S. PATENT DOCUMENTS

| | | | |
|---|---|---|---|
| 6,073,714 A | 6/2000 | McHorse et al. ........ 180/89.14 |
| 6,109,381 A * | 8/2000 | Stuyvenberg et al. .. 296/190.07 |
| 6,168,229 B1 * | 1/2001 | Kooi et al. ............ 296/190.07 |
| 6,206,121 B1 * | 3/2001 | Michel .................. 296/190.07 |
| 6,540,038 B2 | 4/2003 | Taylor et al. ............ 180/89.13 |
| 6,573,659 B2 | 6/2003 | Toma et al. ............... 315/149 |
| 6,644,632 B1 | 11/2003 | Jaberg ..................... 267/64.21 |

* cited by examiner

*Primary Examiner*—Jason Morrow
(74) *Attorney, Agent, or Firm*—Thomte, Mazour & Niebergall; Dennis L. Thomte

(57) ABSTRACT

A height control linkage for a vehicle cab suspension comprising elongated lower and upper linkage members, each of which has upper and lower ends. The lower linkage member has external, vertically spaced-apart, alternating ridges and grooves formed thereon for at least a portion thereof above its lower end. The lower end of the upper linkage member has a generally C-shaped cross-sectional portion defining a gap. The generally C-shaped portion of the upper linkage member has internal, vertically spaced-apart, alternating ridges and grooves which are complementary to the external ridges and grooves of the lower linkage member. The upper end of the lower linkage member is adapted to be vertically adjustably snap-fitted through the gap of the upper linkage member to connect the lower linkage member to the upper linkage member. A snap-clip is provided to maintain the linkage members in their connected relationship. Rotation of one of the linkage members with respect to the other linkage member does not result in a change in the length of the linkage. The linkage members and the snap-clip are preferably comprised of a molded plastic material. The linkage of this invention may be used to link components other than vehicle cab suspensions.

10 Claims, 4 Drawing Sheets

HEIGHT CONTROL LINKAGE FOR A VEHICLE CAB SUSPENSION

BACKGROUND OF THE INVENTION

1. Field of the Invention

This invention relates to a height control linkage for a vehicle cab suspension and more particularly to a height control linkage for a vehicle cab suspension comprised of elongated lower and upper linkage members with the linkage members being able to be snapped together. Although the height control linkage is primarily designed to be used with cab suspension systems, it may also be used with vehicle chassis suspension systems.

2. Description of the Related Art

Many vehicle cab suspensions have been previously provided for supporting a vehicle cab on the chassis of the vehicle whereby a cushioning or shock absorber effect is achieved to provide a more comfortable ride for the occupant or occupants of the cab. Further, many vehicle cab suspensions have been previously provided for adjusting the height of the rear of the cab depending upon the weight of the occupants, etc., within the cab. For example, see U.S. Pat. No. 6,540,038 wherein a vehicle cab suspension system is disclosed including a pair of air bags or air springs which are positioned between the rear of the cab and the truck frame with the air bags being inflatably adjustable to exert an upward force against the underside of the cab. In the device of the '038 patent, the air pressure within the air springs therein may be adjusted through a displacement sensitive valve which is actuated by a selectively length adjustable rod arm. The rod arm or height control linkage of the '038 patent, and in similar prior art designs, requires that in the assembly of the rod arm or height control linkage, prior to installation, one linkage member must be screwed into the other linkage member with lock nuts then being tightened to maintain that length. If one of the linkage members is threadably moved with respect to another, the length of the rod arm changes. It is believed that the assembly of the rod arm of the '038 patent is time-consuming and ergonomically disadvantageous.

A generally similar device to that of the '038 patent is disclosed in U.S. Pat. No. 6,073,714 which includes a linkage arm which is connected to the leveler valve control arm. It is believed that the linkage of the '714 patent suffers the same drawbacks as that of the '038 structure.

SUMMARY OF THE INVENTION

A height control linkage for a vehicle cab suspension is disclosed which comprises an elongated upper linkage member having upper and lower ends and an elongated lower linkage member having upper and lower ends. The upper linkage member, below the upper end thereof, has a generally C-shaped cross-section defining a gap at one side thereof. The lower linkage member has external, spaced-apart, alternating annular ridges and grooves formed thereon above the lower end thereof. The generally C-shaped portion of the upper linkage member has internal, vertically spaced-apart, alternating ridges and grooves which are complementary to the external ridges and grooves on the lower linkage member. The upper end of the lower linkage member is adapted to be vertically adjustably snap-fitted through the gap in the upper linkage member to connect the upper and lower linkage members together. In the preferred embodiment, the upper and lower linkage members are comprised of a plastic material and have hollow, generally ball-shaped sockets formed therein at the upper and lower ends thereof, respectively, which are adapted to receive pivot balls therein to facilitate the connection of the linkage to the cab and the actuator of the air control valve.

It is therefore a principal object of the invention to provide a height control linkage for a vehicle cab suspension system which may be initially assembled in an ergonomically correct manner.

Still another object of the invention is to provide a height control linkage for a vehicle cab suspension system wherein the linkage members thereof may be rotated with respect to one another without changing the length of the linkage.

Yet another object of the invention is to provide a height control linkage for a vehicle cab suspension system including upper and lower linkage members which may be snap-fitted together in the desired length.

Still another object of the invention is to provide a height control linkage for a vehicle cab suspension system which is easily length adjusted in the field.

Still another object of the invention is to provide a height control linkage for a vehicle cab suspension system which is economical of manufacture and durable in use.

These and other objects will be apparent to those skilled in the art.

DETAILED DESCRIPTION OF THE INVENTION

Figure 1:
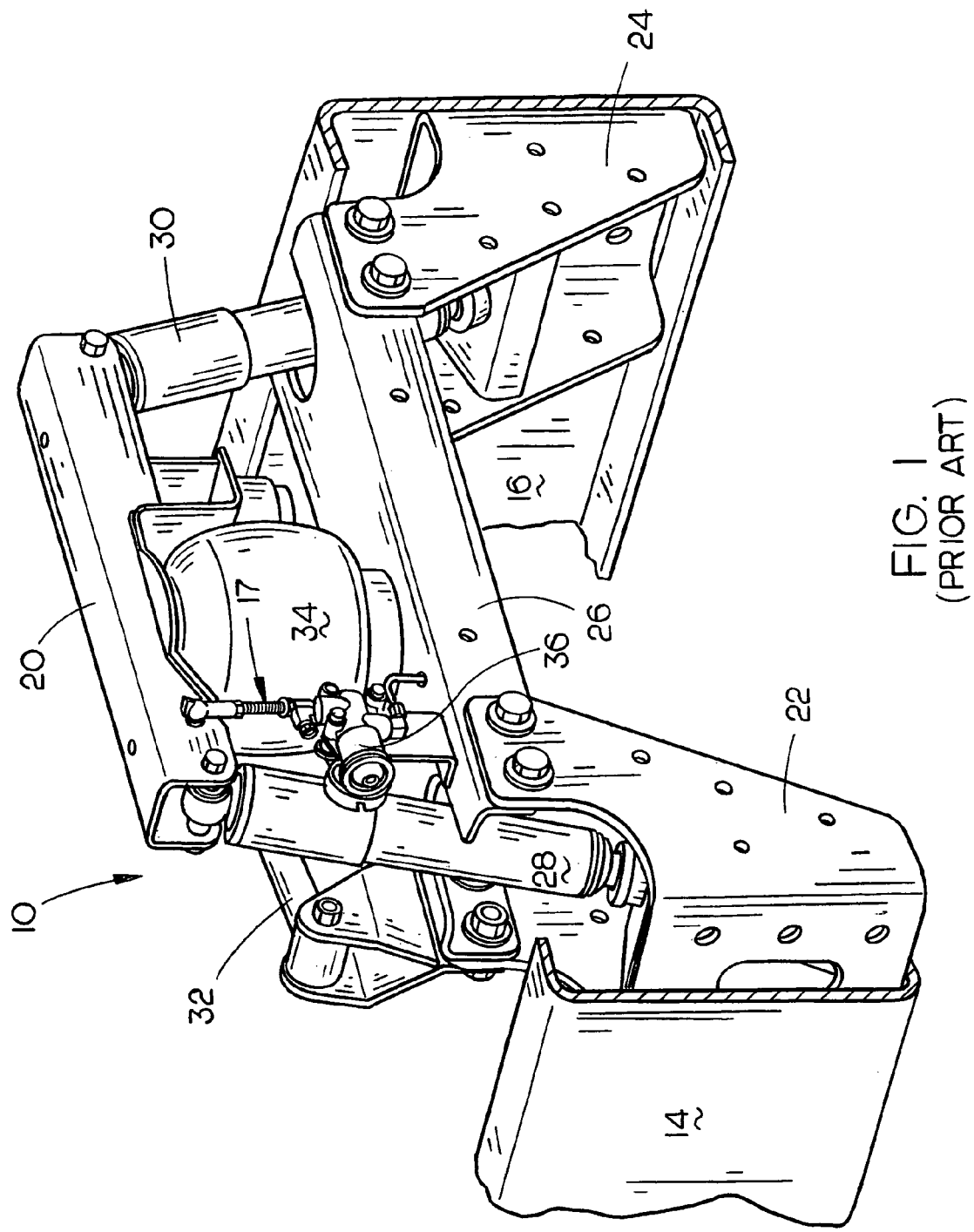
FIG. 1 is a partial perspective view of a prior art cab suspension system.
Figure 2:
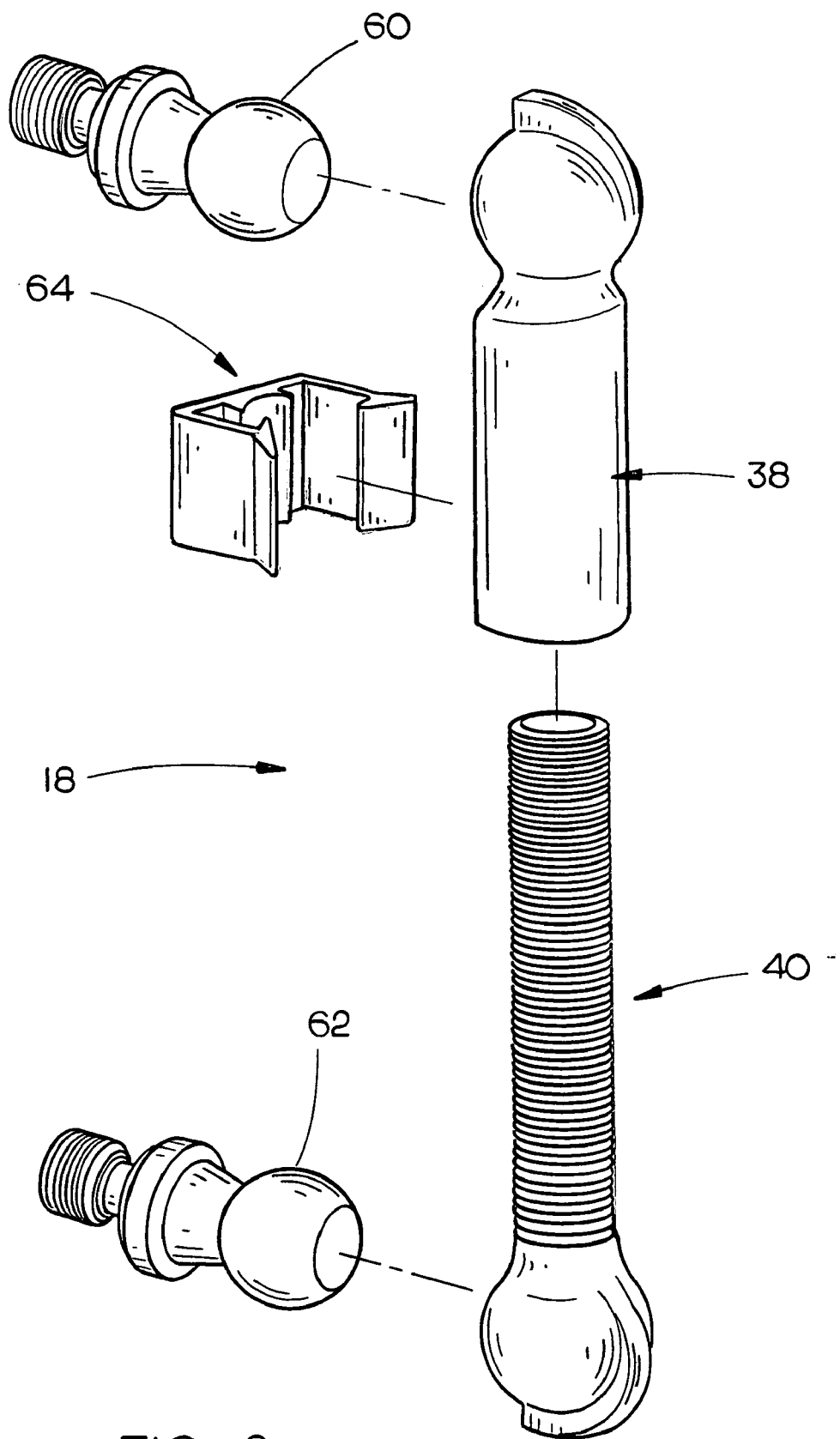
FIG. 2 is an exploded perspective view of the height control linkage of this invention.

The numeral 10 refers generally to a prior art cab suspension system which is designed to be used at the rearward end of a vehicle cab between the cab and the chassis or frame of a vehicle to provide relative vertical movement therebetween. Normally, the forward end of the cab is pivotally secured to the chassis at a pair of spaced-apart locations whereby the cab may pivot, about a horizontal axis, with respect to those pivot locations. The vehicle upon which the cab is mounted normally consists of a pair of frame rails 14 and 16. The cab suspension system 10 disclosed in the drawings is identical to or similar to many types of cab suspension systems which include a height control linkage 17. In the prior art suspension systems, the linkage 17 comprises at least a pair of linkage members which are threadably secured together and which may be threadably rotatably moved with respect to one another to change or adjust the length thereof. As stated hereinbefore, the assembly and adjustment of the prior art height control linkage members suffers from many disadvantages.

Suspension system 10 includes an upper frame member or sill 20 which is secured to the rear end of the cab in conventional fashion. Brackets 22 and 24 are secured to the frame rails 14 and 16, respectively, and have a frame member 26 secured thereto and extending therebetween at the upper ends thereof. Shock absorber 28 extends between bracket 22 and one end of the frame member 20 while shock absorber 30 extends between bracket 24 and the other end of frame member 20. A torsion bar 32 is also usually included in such a suspension system. One or more air springs 34 are positioned between frame members 20 and 26 and are adjustably inflatable so as to exert an upward force against the frame member 20 and thus the cab. Air spring 34 is operatively connected to a source of pressurized or compressed air in conventional fashion through a control valve 36 which has a conventional actuator or arm pivotally mounted thereon. The linkage 17 is connected to the actuator or arm of the control valve 36 and the frame member 20 for controlling the inflation or deflation of the air spring 34. Applicants' linkage 18 is designed to replace the linkage 17 and other height control linkages employed on other prior art cab suspensions.

Figures 3, 4:
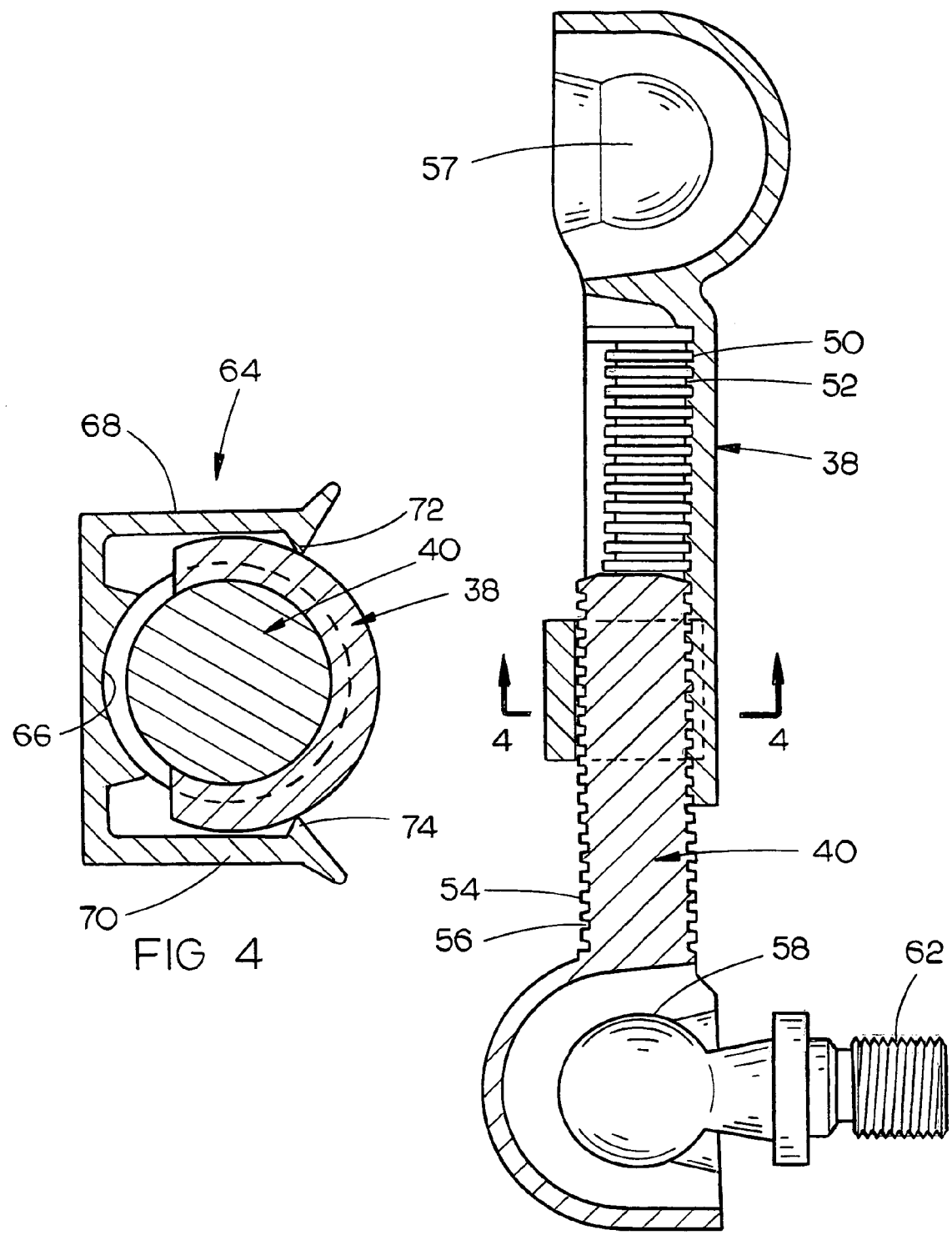
FIG. 3 is a vertical sectional view of the height control linkage of this invention.
FIG. 4 is an enlarged sectional view as seen on lines 4—4 of FIG. 3.
Figure 5:
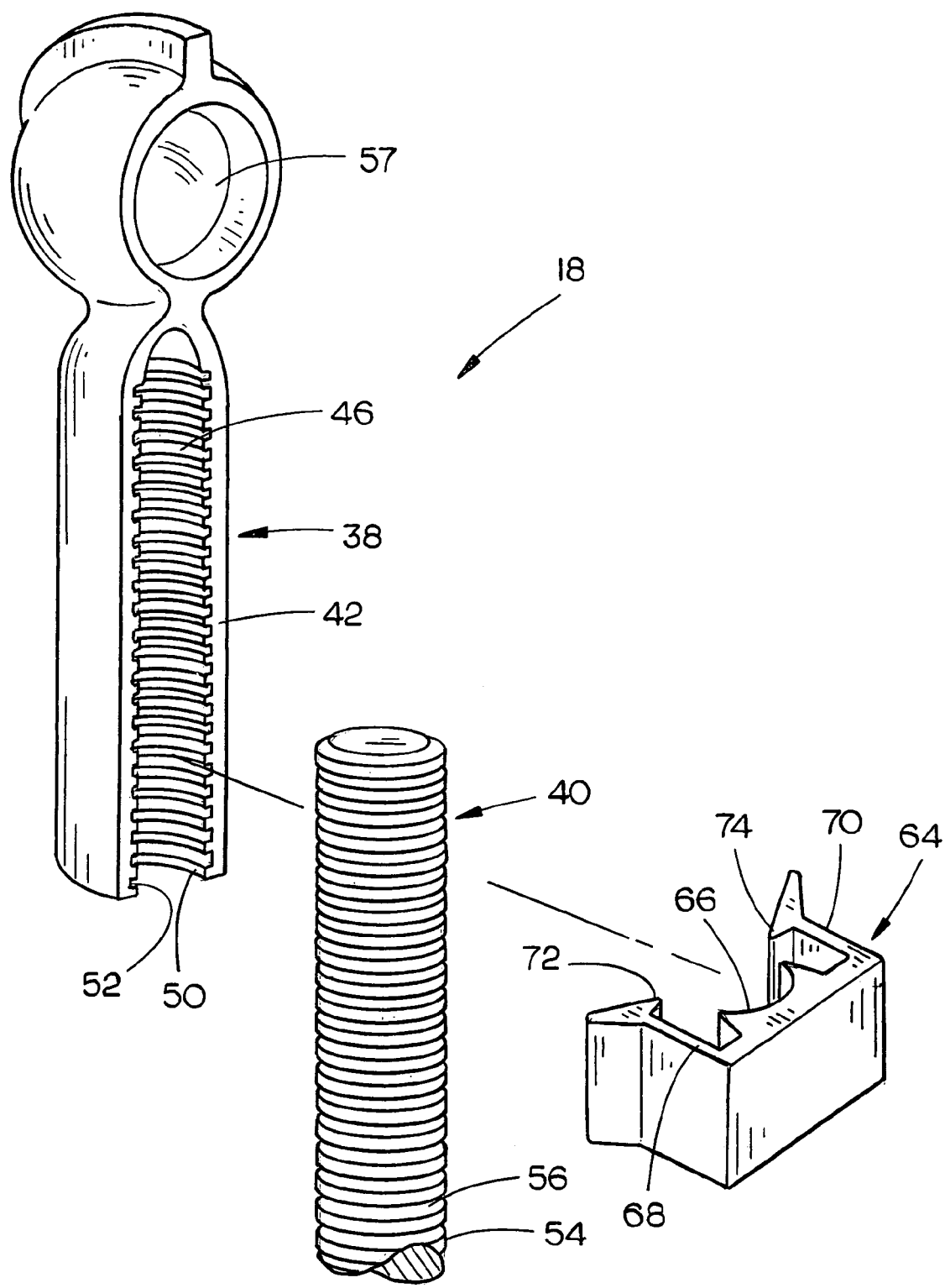
FIG. 5 is a partial exploded perspective view of illustrating the manner in which the linkage members are snapped together.

Linkage 18 includes an elongated upper linkage member 38 and an elongated lower linkage member 40. The cross-sectional configuration of the upper linkage member 38, below the upper end thereof, is generally C-shaped, as illustrated in FIGS. 4 and 5, to define a gap 42 at one side thereof. Upper linkage member 38 includes an interior surface 46 configured such that the gap 42 defines an opening which is less than the diameter of the upper end of lower linkage member 40, as illustrated in FIG. 4. The lower end of upper linkage member 38 is provided with internal, vertically spaced-apart, alternating ridges 50 and grooves 52. The upper end of upper linkage member 38 is provided with a socket 57 formed therein.

The lower linkage member 40, above the lower end thereof, is provided with a plurality of external, vertically spaced-apart, alternating ridges 54 and grooves 56. The lower end of lower linkage member 40 is provided with a socket 58 formed therein. Sockets 57 and 58 are adapted to receive pivot balls 60 and 62 therein, respectively, so that the upper linkage member may be secured to frame member 20 and so that lower linkage member 40 may be secured to the actuator arm or lever of the control valve 36.

The lower and upper linkage members are preferably comprised of a plastic material such as polyethylene, nylon, glass filled nylon, plastic composites, etc. The linkage members 38 and 40 are easily connected together to create a height control linkage of the desired length by simply snapping the upper end of lower linkage member 40 into the upper linkage member 38 through the gap 42 so that the grooves and ridges of the lower linkage member 40 are received by the ridges and grooves of upper linkage member 38. The sockets 57 and 58 of the linkage members may be rotated with respect to one another without changing the length of the linkage since the grooves and ridges are not helically designed such as threads but are vertically spaced-apart. Thus, in the assembly of the linkage 18, it is not necessary for linkage members 38 and 40 to be threadably secured together which would require several rotations of one of the linkage members with respect to the other linkage member which creates ergonomic concerns. Once installed on the vehicle, the linkage 18 may be easily length adjusted by changing the relationship of linkage member 40 with respect to linkage member 38.

An optional generally U-shaped spring-clip 64 is also provided with is adapted to snap over the lower end of upper linkage member 38, as seen in the drawings, to extend across the gap 42 to prevent the inadvertent separation of the linkage members 38 and 40. The clip 64 has an internal arcuate surface 66 which is adapted to be positioned adjacent the exterior surface of that portion of linkage member 40 which is positioned in the gap 42. The inner ends of the legs 68 and 70 of clip 64 are provided with protrusions 72 and 74, respectively, so that the clip 64 will snap onto the exterior surface of the upper linkage member 18. Although linkage member 38 is described as the upper linkage member and linkage member 40 is described as the lower linkage member, linkage member 40 could be the upper linkage member and linkage member 38 could be the lower linkage member.

Thus it can be seen that a unique height control linkage has been provided for use with a vehicle cab suspension which accomplishes at least all of its stated objectives.

We claim:

1. In combination:
   a vehicle including a frame having rearward and forward ends, a cab, having rearward and forward ends, movably supported upon said frame whereby said rearward end of said cab may move upwardly and downwardly with respect to said frame;
   a cab suspension system positioned at said rearward end of said cab for exerting an upward force upon said cab;
   said cab suspension system comprising a lower frame member secured to said vehicle frame, an upper frame member secured to said cab, an adjustable inflatable air spring positioned between said upper and lower frame members for exerting an upwardly force upon said cab, said air spring being in communication with a source of air under pressure, an air valve operatively fluidly connected to said air spring which controls the flow of pressurized air into and out of said air spring, said air valve including an actuator;
   and a linkage operably secured to and extending between said upper frame member and said actuator;
   said linkage comprising:
   an elongated lower linkage member having upper and lower ends;
   said lower linkage member having external, vertically spaced-apart, alternating annular ridges and grooves formed thereon for at least a portion of its upper end;
   an elongated upper linkage member having upper and lower ends;
   said upper linkage member below its upper end having a generally C-shaped cross-section defining a gap;
   said upper linkage member having internal, spaced-apart, alternating ridges and grooves complementary to said external ridges and grooves on said lower linkage member;
   said upper end of said lower linkage member being able to be vertically adjustably snap-fitted through said gap to connect said upper and lower linkage members together.

2. The combination of claim 1 wherein said upper linkage member is comprised of a plastic material.

3. The combination of claim 2 wherein said lower linkage member is comprised of a plastic material.

4. The combination of claim 1 wherein a pivot ball is secured to said lower end of said lower linkage member.

5. The combination of claim 1 wherein said lower end of said lower linkage member has a hollow, generally ball-shaped socket formed therein.

6. The combination of claim 5 wherein a pivot ball is movably mounted in said hollow, generally ball-shaped socket.

7. The combination of claim 1 wherein said upper end of said upper linkage member has a hollow, generally ball-shaped socket formed therein.

8. The combination of claim 7 wherein a pivot ball is mounted in said hollow, generally ball-shaped socket.

9. The combination of claim 1 further including a clip-like device which at least partially embraces said upper linkage member to maintain said lower linkage member in said upper linkage member.

10. The combination of claim 9 wherein said clip-like device is generally U-shaped.

* * * * *